(12) United States Patent
Knight et al.

(10) Patent No.: US 11,016,067 B2
(45) Date of Patent: May 25, 2021

(54) SORBENT TUBE HOLDER

(71) Applicant: EnDet Limited, Market Drayton (GB)

(72) Inventors: Jeremy Knight, Market Drayton (GB); Tom Knight, St Just (GB)

(73) Assignee: ORBITAL ENERGY GROUP, INC., Houston, TX (US)

( * ) Notice: Subject to any disclaimer, the term of this patent is extended or adjusted under 35 U.S.C. 154(b) by 430 days.

(21) Appl. No.: 15/567,593

(22) PCT Filed: Apr. 18, 2016

(86) PCT No.: PCT/GB2016/051067
§ 371 (c)(1),
(2) Date: Oct. 18, 2017

(87) PCT Pub. No.: WO2016/170309
PCT Pub. Date: Oct. 27, 2016

(65) Prior Publication Data
US 2018/0088092 A1    Mar. 29, 2018

(30) Foreign Application Priority Data

Apr. 20, 2015  (GB) .................................... 1506662

(51) Int. Cl.
*G01N 30/60*   (2006.01)
*B01L 9/06*    (2006.01)
(Continued)

(52) U.S. Cl.
CPC ............ *G01N 30/6047* (2013.01); *B01L 9/06* (2013.01); *B01L 9/50* (2013.01); *G01N 1/2214* (2013.01);
(Continued)

(58) Field of Classification Search
None
See application file for complete search history.

(56) References Cited

U.S. PATENT DOCUMENTS 2,234,499 A * 3/1941 McAllister ............. G01N 30/62
422/86
2,429,694 A * 10/1947 King .................... G01N 31/222
436/39
(Continued)

FOREIGN PATENT DOCUMENTS

GB       2450628 A     12/2008

OTHER PUBLICATIONS

Intellectual Property Office (UK), Search Report under Section 17 issued in UK Application No. GB1506662.4 dated May 18, 2015, 1 page.
(Continued)

*Primary Examiner* — Jill A Warden
*Assistant Examiner* — Brittany I Fisher
(74) *Attorney, Agent, or Firm* — Zeller IP Group, PLLC; Serge Krimnus

(57) ABSTRACT

A sorbent tube holder (100) for securing a sorbent tube (10) in position in a fluid-flow system, the sorbent tube holder (100) comprising: an mounting element (126) having first and second opposed ends (126a, 126b) which define a tube mounting axis (A-A); at least one fastener (128) in communication with the mounting element (126) for providing a releasable tube retaining force; at least one sorbent tube (10) engaged with the mounting element (126); and a holder frame (130) to which the mounting element (126) is attached to prevent or limit movement of the mounting element (126) perpendicular to the tube mounting axis. A method of preventing or limiting unintentional damage to a sorbent tube, and a portable tube holder are also provided.

6 Claims, 5 Drawing Sheets

(51) Int. Cl.
B01L 9/00 (2006.01)
G01N 1/22 (2006.01)
G01N 30/88 (2006.01)

(52) U.S. Cl.
CPC ... *B01L 2200/025* (2013.01); *B01L 2200/026* (2013.01); *B01L 2200/08* (2013.01); *B01L 2200/18* (2013.01); *G01N 30/6091* (2013.01); *G01N 2030/8868* (2013.01); *G01N 2030/8872* (2013.01)

(56) References Cited

U.S. PATENT DOCUMENTS

| | | | | |
|---|---|---|---|---|
| 2,631,088 | A * | 3/1953 | Guild | G01N 7/04 422/88 |
| 3,311,454 | A | 3/1967 | Kemeny et al. | |
| 3,388,975 | A * | 6/1968 | Wallace | G01N 21/783 422/413 |
| 3,539,302 | A * | 11/1970 | Dreckmann | G01N 31/22 422/86 |
| 3,615,235 | A * | 10/1971 | Hrdina | B01J 8/06 422/70 |
| 3,978,575 | A * | 9/1976 | Beyer | B01D 15/206 29/426.4 |
| 4,040,783 | A * | 8/1977 | Collin | G01M 15/10 436/116 |
| 4,170,901 | A | 10/1979 | Conkle et al. | |
| 4,389,372 | A * | 6/1983 | Lalin | G01N 1/2273 422/562 |
| 4,732,672 | A * | 3/1988 | Kiang | G01N 30/22 210/198.2 |
| 4,845,025 | A * | 7/1989 | Lary | B01F 11/0014 435/2 |
| 5,186,899 | A * | 2/1993 | Drago | B01L 9/00 422/562 |
| 5,319,986 | A * | 6/1994 | Padden | G01N 1/2273 422/408 |
| 2004/0166679 | A1 * | 8/2004 | Kishkovich | H01L 21/67253 438/689 |
| 2006/0008390 | A1 * | 1/2006 | Prentice | G01N 30/6047 422/504 |
| 2006/0113794 | A1 | 6/2006 | Plant et al. | |
| 2010/0154207 | A1 * | 6/2010 | Ford | G01N 30/6047 29/700 |
| 2012/0197544 | A1 * | 8/2012 | Briscoe | G01N 1/2273 702/25 |

OTHER PUBLICATIONS

European Patent Office, International Search Report and Written Opinion issued in International Application No. PCT/GB2016/051067 dated Jul. 7, 2016.
Examination Report issued by UK Intellectual Property Office in No. GB1506662.4, dated Oct. 1, 2020.
Harvard Apparatus Stronghold Support Glassware Buret Clamps, Available from: https://labgenome.com/53-2178-wharvard-apparatus-stronghold-supportglassware-buret-clamps-condenserclamp-each-of-1/.
OctaveTM Column Stand, Rectangular, Available from: http://sembabio.com/product/octavecolumn-stand-rectangular/, accessed Sep. 30, 2020.
Double Burette Clamp Holder Alloy, Available from: https://www.camlab.co.uk/doubleburette-clamp-holder-alloy, accessed Sep. 30, 2020.

* cited by examiner

SORBENT TUBE HOLDER

The present invention relates to a tube holder, in particular for holding a sorbent tube in position as part of a fluid-flow system. A method of preventing or limiting accidental damage to a sorbent tube, and a portable tube holder are also provided.

One means of measuring trace analytes in a fluid system is by providing a sorbent, or solid-adsorbent, trap, formed as a glass tube having a sorbent material inserted therein. This is used, in particular, for measuring trace levels of mercury in processed or unprocessed methane or similar hydrocarbon gases.

Traditionally, trace analytes could be analysed in relatively ambient conditions, such as in the atmosphere around an area to be analysed, for example, in a combustion stack or chimney. However, it has become more common for the trace analytes to be detected in pressurised conditions, and therefore the sorbent tube was developed so as to be inserted into a pressurised fluid line.

Since the sorbent trap is formed in a glass tube, it is particularly difficult to make a reliable connection for the sorbent trap with a fluid-flow system, such as a pipe manifold, and this can be made more challenging in dangerous conditions where a user may be required to wear protective clothing and gloves.

Since the installer may be encumbered, it is quite common for the sorbent trap to become damaged during installation or uninstallation, which can potentially be very hazardous to the installer, either due to leakage of pressurised and potentially toxic materials, or due to the potential for lacerations due to broken glass.

It is an object of the present invention to provide a means of preparing a sorbent tube prior to installation such that the tube can be readily installed in hazardous conditions with minimal risk to the user.

According to a first aspect of the invention there is provided a sorbent tube holder for securing a sorbent tube in position in a fluid-flow system, the sorbent tube holder comprising: a mounting element having first and second opposed ends which define a tube mounting axis; at least one fastener in communication with the mounting element for providing a releasable tube retaining force; at least one sorbent tube engaged with the mounting element; and a holder frame to which the mounting element is attached to prevent or limit movement of the mounting element perpendicular to the tube mounting axis.

A tube holder which secures the sorbent tube in position such that first and second ends of the tube cannot be dislocated relative to one another advantageously limits the probability of damage occurring to the sorbent tube, particularly where a user is attempting to install the sorbent tube directly into a pressurised fluid-flow system. This minimises the risk to the installer, whilst also limiting the need to provide replacement sorbent tubes due to accidental breakage.

The mounting element may be or may include a mounting sleeve positioned on the tube mounting axis, the mounting element being receivable about an engaged sorbent tube, which may comprise first and second mounting sleeve portions. At least one fastener may be provided in communication with each of the first and second mounting sleeve portions. The or each fastener may be a clamping element, which may present a clamping force acting perpendicular to the tube mounting axis. Alternatively, the or each fastener may be a screw-threaded fastening element.

A sleeve receivable about a sorbent tube is a simple means of providing secure engagement within a tube holder, without damaging the fragile tube body during installation.

Preferably, the holder frame may comprise an elongate frame portion attached to the first and second ends of the mounting element, and the elongate frame portion may have a lateral extent which is greater than an in use lateral extent of the mounting element and the or each fastener.

By providing a rigid frame portion which limits the potential for relative movement along the tube mounting axis for the mounting element, the potential for damage to the sorbent tube is limited. The frame portion can also be formed so as to act as a blocker, limiting the probability of accidental user collision with the sorbent tube.

In a preferred embodiment, the holder frame may comprise a cover element which covers or substantially covers the mounting element and said at least one sorbent tube. Optionally, the cover element may be at least in part openable or releasable to permit a user to access the mounting element.

By providing a cover element which substantially covers the sorbent tube ensures that the sorbent tube is shielded from as much damage as possible during transportation. The tube holder can therefore be utilised as a sorbent tube installation device, reducing the time taken to install a single sorbent tube; the whole tube holder, inclusive of the cover element, can be inserted, merely requiring the pipe connectors to be connected into the fluid-flow system. This advantageously simplifies the procedure for replacing and installing sorbent tubes.

Preferably, a user-engagement handle may be attached to the holder frame.

By providing a handle engaged with the holder frame, the entire tube holder can be provided as a portable, easily-installable unit, removing the need to carry delicate sorbent tubes separately, which might otherwise become damaged in transit or during installation.

The sorbent tube holder may further comprise a pipe connection element engagable with the first or second end of the mounting element, which may be releasably engagable with the first or second end of the mounting element, and/or may be a screw-threaded pipe manifold connection element.

The provision of pipe connectors attached with the tube holders further simplifies the installation process for a tube holder; there may just be two point of connection which can be simply screwed together in order to install a sorbent tube, which would otherwise be relatively cumbersome to install.

According to a second aspect of the invention, there is provided a sorbent tube holder for securing a sorbent tube in position in a fluid-flow system, the sorbent tube holder comprising: a mounting element having first and second opposed ends which define a tube mounting axis; at least one fastener in communication with the mounting element for providing a releasable tube retaining force; and a holder frame to which the mounting element is attached to prevent or limit movement of the mounting element perpendicular to the mounting tube axis.

The sorbent tube holder is a quick and easy tool for installing a sorbent tube into a pressurised fluid system, which removes the need for an installer to have to handle a fragile, typically glass, tube, which might present significant challenges in hazardous environments.

According to a third aspect of the invention, there is provided a method of preventing or limiting accidental damage to a sorbent tube, preferably utilising a sorbent tube holder in accordance with the first or second aspect of the invention, the method comprising the steps of: a] providing first and second mounting points for the sorbent tube at first and second ends of the sorbent tube, the first and second mounting points being rigidly interconnected; and b] engaging the sorbent tube with said first and second mounting points such that the sorbent tube is securely held along a longitudinal axis thereof.

The method may preferably further comprise the step of providing a cover element engaged with the first and second mounting points, the cover element covering or substantially covering the sorbent tube to prevent unintentional user contact therewith. A handle may optionally be provided in engagement with the cover element to permit a user to safely transport the mounted sorbent tube.

By rigidifying the sorbent tube holder, and providing a means for making the holder portable and readily-installable, it becomes possible to install a sorbent tube into a fluid-flow system without significantly increasing the risk of harm to the installer or significantly increasing the risk of damage to the sorbent tube.

According to a fourth aspect of the invention, there is provided a portable tube holder for securing a tube for dynamic scientific analysis of a sample, the tube holder comprising: a mounting element having first and second mounting points releasably engagable with the tube; a sample inlet associated with the first mounting point; a sample outlet associated with the second mounting point; and a holder frame for rigidly supporting the mounting element, the holder frame including a cover element which encloses or substantially encloses the mounting element, and a user engagement portion to allow a user to readily transport the portable tube holder.

The portable tube holder is a simplified means of installing a sorbent tube into a fluid-flow system, which mitigates the risk of damaging the sorbent tube, thereby reducing the risk to the installer.

The invention will now be more particularly described, by way of example only, with reference to the accompanying drawings, in which.

Figure 1:
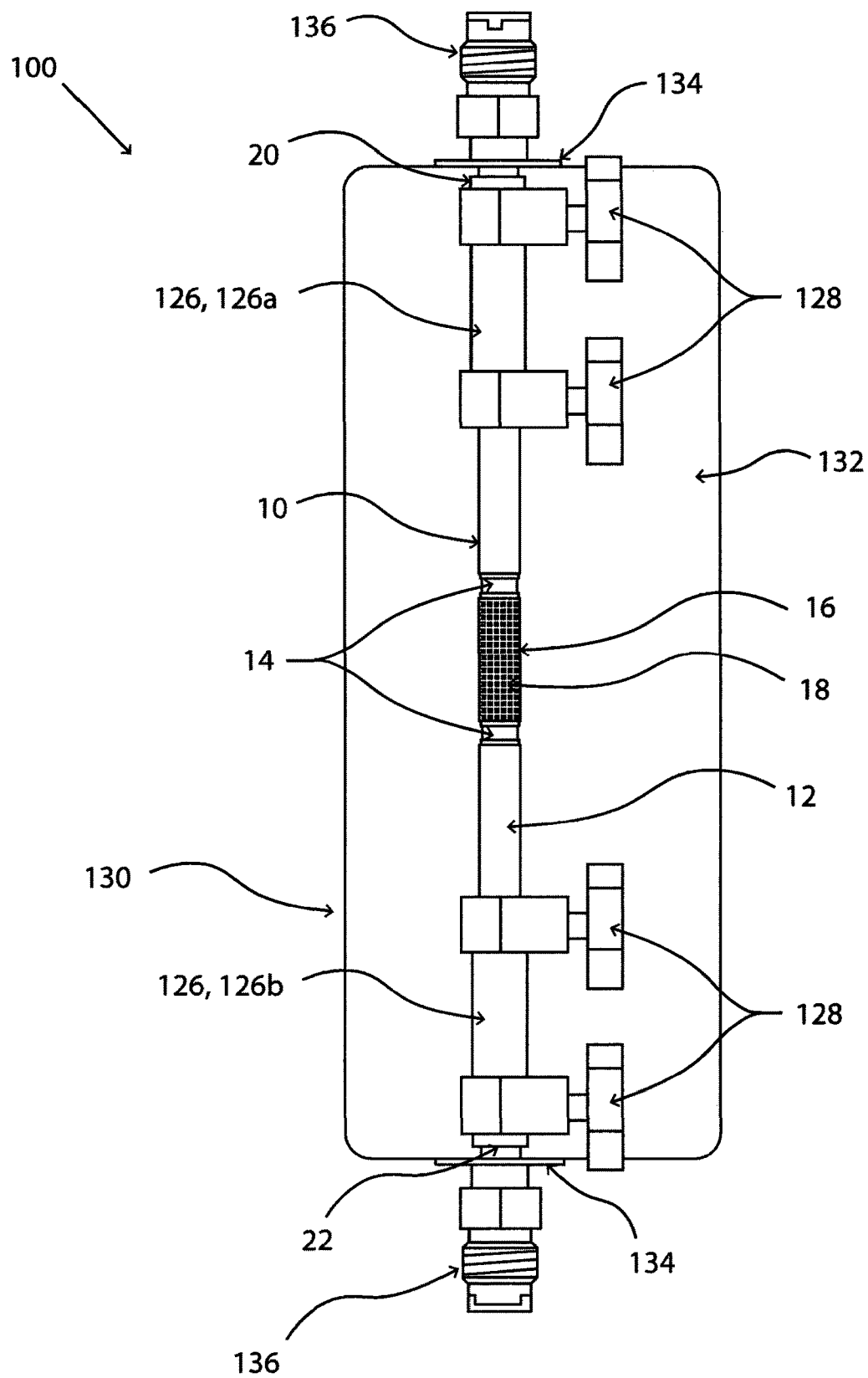
FIG. 1 shows a top plan view of a first embodiment of a sorbent tube holder, including an engaged sorbent tube, in accordance with the first aspect of the invention.
Figure 2:
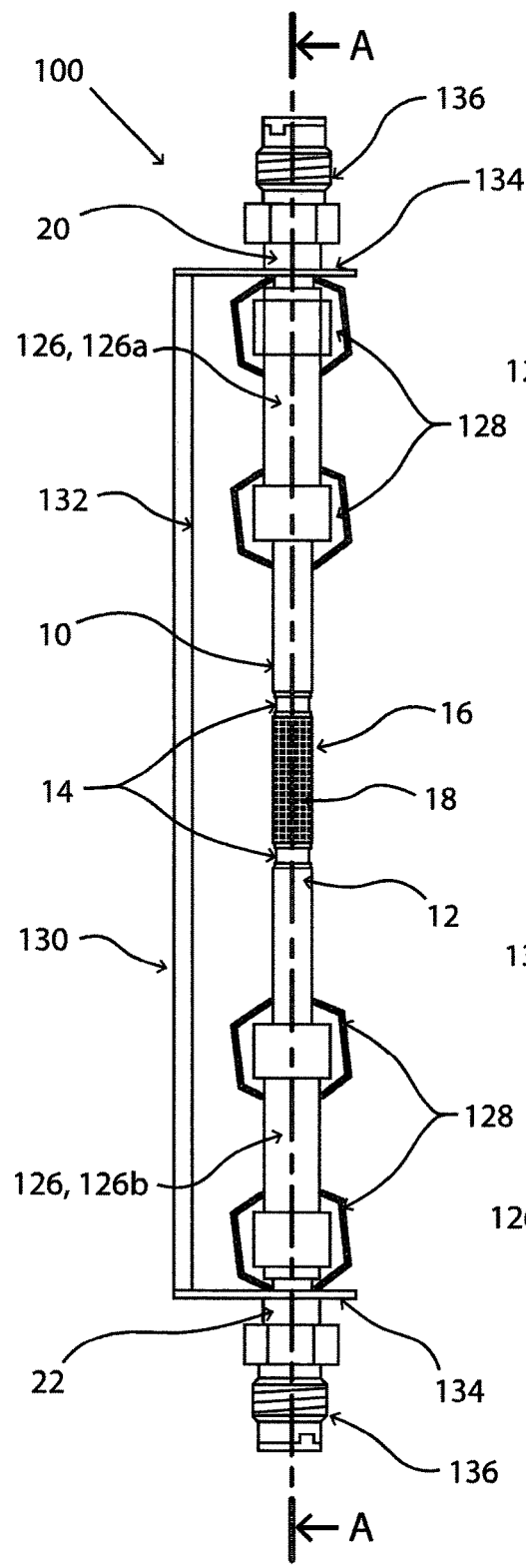
FIG. 2 shows a side plan view of the sorbent tube holder of FIG. 1.
Figure 3:
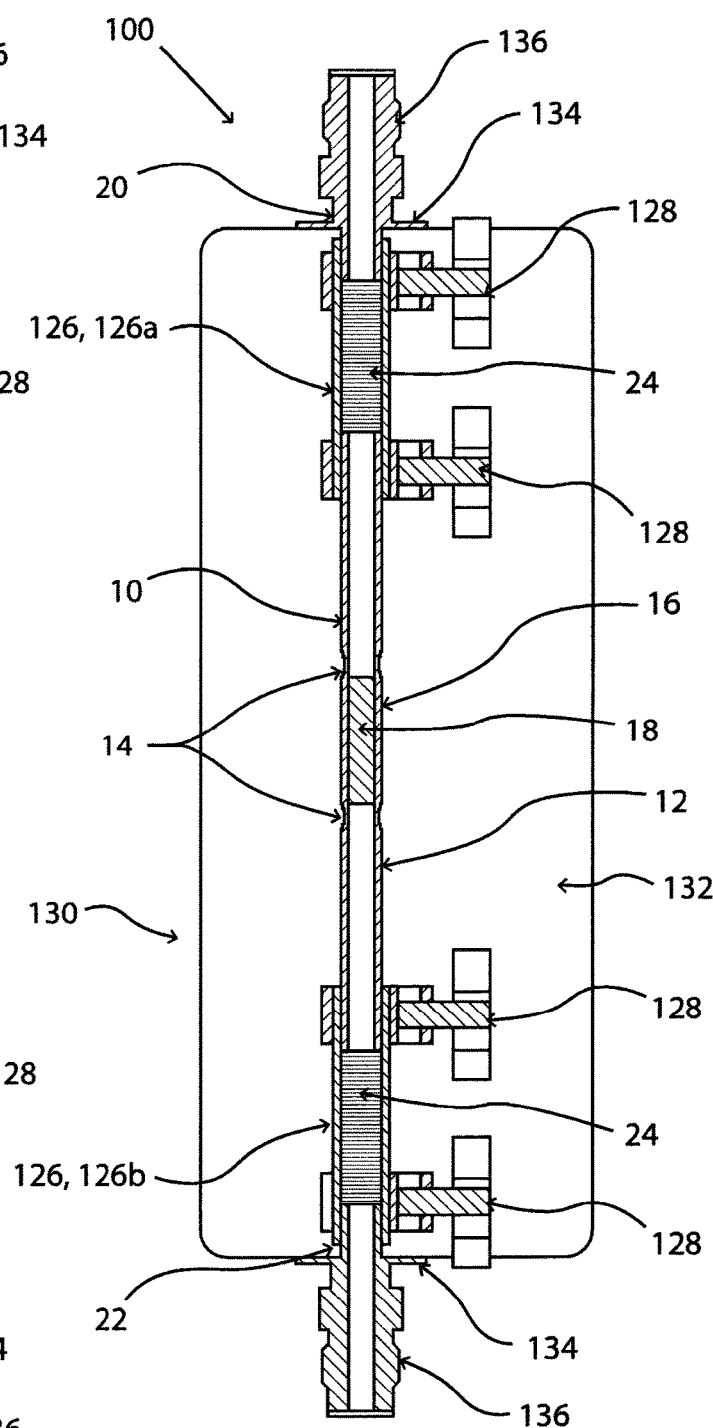
FIG. 3 shows a top plan view of the sorbent holder of FIG. 1, taken through the cross-sectional line A-A illustrated in FIG. 2.

Referring firstly to FIGS. 1 to 3, there is shown a sorbent, or solid-adsorbent, tube holder, indicated globally at 100, for securing a sorbent tube 10 in position as part of a fluid-flow system.

The sorbent tube 10 itself is formed comprising an elongate, preferably or typically glass, tube body 12 having two spaced-apart circumferential dimples or waisted portions 14 formed into the tube body 12 close to a longitudinal centre of the tube body 12 to define a central chamber 16. Within the central chamber 16 is positioned a sorbent material 18, which, for the illustrated mercury trap, is a gold-coated quartz sand.

Numerous types of sorbent material are known, however, such as activated charcoal, silica gel or organic porous polymers, and any suitable type of sorbent tube could feasibly be utilised with the present invention.

The tube body 12 has openings at first and second longitudinal ends 20, 22 which define a fluid inlet and fluid outlet of the sorbent tube 10, allowing fluid to be passed through the tube body 12 and across the sorbent material 18 such that analytes can be adsorbed onto the sorbent material 18. At each of the first and second ends 20, 22, there is positioned a protective sheath 24 around the outside of the tube body 12, allowing the sorbent tube 10 to be mounted without damaging the fragile tube body 12.

The sorbent tube holder 100 comprises a mounting element, which in the depicted embodiment is formed as an elongate mounting sleeve 126 having first and second spaced-apart mounting portions 126a, 126b. The mounting sleeve 126 defines a tube mounting axis, indicated by line A-A in FIG. 2, along which the sorbent tube 10 is receivable in an in use engaged condition.

The sorbent tube holder 100 also includes at least one fastener engaged with the mounting element, which is here illustrated as two ring clamps 128 associated with each of the first and second mounting portions 126a, 126b. The mounting sleeve 126 is then attached to a holder frame 130, which preferably comprises an elongate frame element 132 positioned in a plane parallel to the tube mounting axis A-A, and having first and second perpendicular walls 134 which are connected respectively to the first and second mounting portions 126a, 126b. The frame element 132 is therefore spaced-apart from the mounting sleeve 126. The frame element 132 could feasibly be provided with connectors to allow the sorbent tube holder 100 to be mounted to a wall or other surface.

The holder frame 130 is preferably a planar or substantially planar mounting plate formed from a rigid material, such as a metal, for example, stainless steel. The mounting plate provides a rigid or inflexible skeleton or support for the mounting sleeve 126 to prevent or limit movement of the first and second mounting portions 126a, 126b with respect to one another along the tube mounting axis A-A. To provide a buffer to act against accidental user contact with the engaged sorbent tube 10, the frame element 132 is preferably wider than the in use mounting sleeve 126 and ring clamps 128, thereby extending laterally beyond the fasteners 128, sorbent tuber 10, and in this case also the upstanding walls 134.

Engaged with the mounting sleeve portions 126a, 126b are pipe connection elements 136, which are preferably screw-threaded or releasable push-fit connectors for simple connection to an existing fluid-flow system, such as a pipe manifold. These pipe connection elements 136 may be provided installed or integrally with the sorbent tube holder 100, or may be installed after the sorbent tube 10 is inserted.

It will be appreciated that, although the mounting sleeve 126 is here provided as first and second mounting sleeve portions 126a, 126b, a unitary sleeve, spanning the length of the sorbent tube 10 could be provided and clamped in position; there is no requirement for the central chamber 16 of the sorbent tube 10 to be accessible or visible, other than for ease of alignment during installation.

Furthermore, the ring clamps 128 as shown are not necessarily the only means of fixedly securing the sorbent tube 10 in place. Some means of clipping the sorbent tube 10 into position could be utilised or alternative forms of grips or clamps, perhaps utilising snap-fit engagement, may be considered.

In use, the sorbent tube 10 is inserted into the mounting sleeve 126 such that each of the protective sheaths 24 is in direct contact with one of the first and second mounting sleeve portions 126a, 126b. This may be achieved by, for example, sliding the sorbent tube 10 through the mounting sleeve 126 prior to securing the fasteners.

Once the sorbent tube 10 is correctly positioned within the mounting sleeve 126, the ring clamps 128 can be tightened so as to apply a clamping force perpendicular to the tube mounting axis A-A at each of the first and second mounting sleeve portions 126a, 126b, the clamping force being transferred through each mounting sleeve portion 126a, 126b to the protective sheaths 24, protecting the fragile tube body 12 from damage.

If the pipe connection elements 136 have not been attached thus far to the mounting sleeve 126 or holder frame 130, then these may be attached subsequent to engagement of the sorbent tube 10 within the mounting sleeve 126. The sorbent tube holder 100 can then be brought into its correct position, and the pipe connection elements 136 connected into the fluid-flow system to be analysed. The fluid sample can then be passed across the sorbent material 18 so as to collect the relevant analytes.

The holder frame 130 maintains the axial alignment of the first and second mounting element portions 126a, 126b, thereby preventing or limiting shear forces causing the fragile tube body 12 to crack or become damaged.

The combination of the sorbent tube holder 100 and sorbent tube 10 creates a nominal sorbent tube installation device, which can be provided as a single unit to simplify the installation and support of a sorbent tube 10 into a fluid-flow system. There are only two points of contact, the pipe connection elements 136, which must be installed into the fluid-flow system in order to install the sorbent tube 10. This means that the awkward installation of the sorbent tube 10 itself into the mounting element 126 can be performed in a laboratory, for instance, rather than on site at the fluid-flow system, where conditions may be hazardous.

Figure 4:
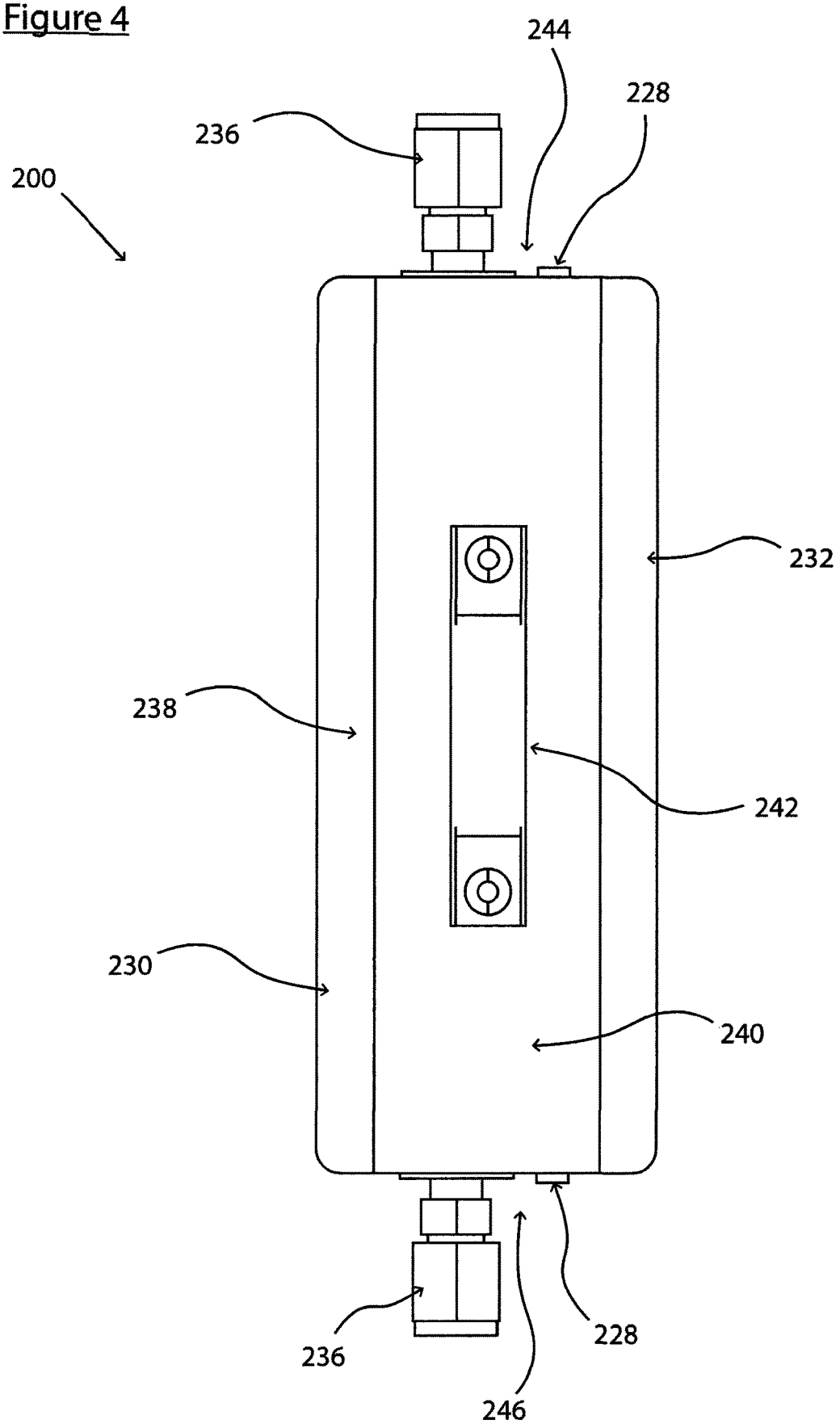
FIG. 4 shows a top plan view of a second embodiment of a sorbent tube holder, also in accordance with the first aspect of the invention.
Figure 5:
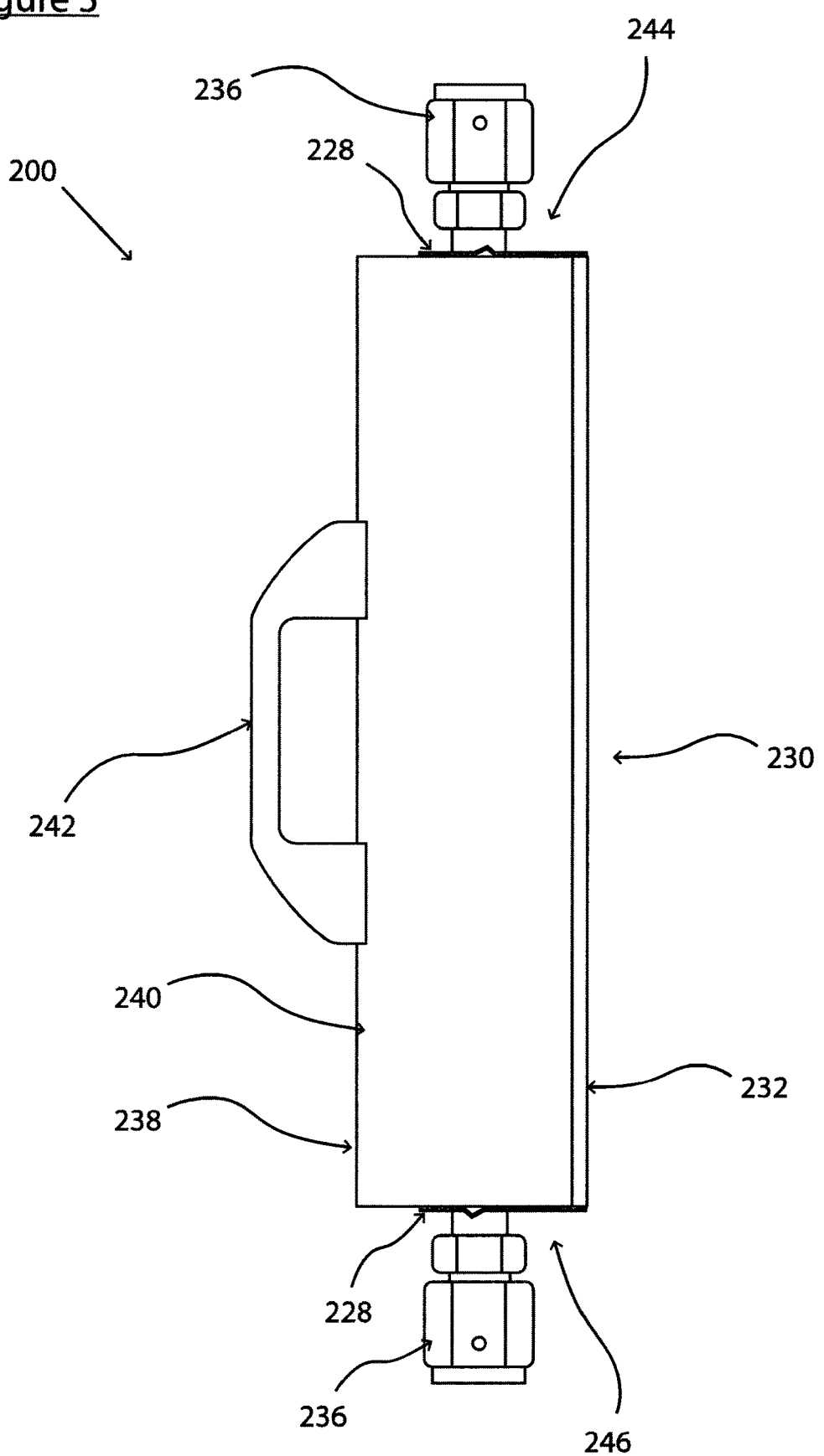
FIG. 5 shows a side plan view of the sorbent tube holder of FIG. 4.

A second embodiment of the sorbent tube holder is indicated in FIGS. 4 and 5 at reference 200. Identical or similar reference numerals are used to refer to identical or similar components, and further detailed description is omitted for brevity.

In this embodiment of the sorbent tube holder 200, the holder frame 230 includes a protective cover element 238 in addition to elongate frame element 232. The cover element 238 is here formed having a preferably semi- or part-cylindrical cover body 240 to which is attached a handle 242 allowing a user to readily pick up and transport the sorbent tube holder 200 as a single unit.

In the depicted embodiment, the cover element 238 is fixedly secured to the frame element 232, with openings at the top and bottom ends 244, 246 of the cover element 238 to allow the pipe connection elements 236 to project outwardly from the sorbent tube holder 200. As illustrated, portions, such as the user-interface knob, of the ring clamps 228 may also project from the top and bottom ends 244, 246 slightly. It will be appreciated that end caps to the cover element could feasibly be provided to also cover the top and bottom ends 244, 246, and/or the cover element 238 could be provided in releasable engagement with the frame element 232, for example, via snap-fit fastenings, or could be pivotably openable via one or more hinges to allow access to the sorbent tube 10 within.

The cover element 238 serves two purposes: firstly, it provides an enclosure, either fully or substantially covering the sorbent tube 10, to prevent unintentional damaging contact with the sorbent tube 10; secondly, the cover element 238 provides a convenient surface to which a handle 242 can be attached to allow for transportation of the sorbent tube holder 200 once disconnected from a fluid-flow system.

The provision of the handle 242 or a similar user engagement means allows for the sorbent tube holder 200 to be constructed as a single portable sorbent tube installation device. Rather than installing a delicate sorbent tube 10 within a fluid-flow system each time the sorbent tube 10 needs to be changed, it is now possible to merely install the sorbent tube holder 200, directly attaching the pipe connection elements 236 into the fluid-flow system. This advantageously reduces the need for a user to contact the sorbent tube 10, significantly reducing the probability of damage to the sorbent tube 10 during installation. The sorbent tube holder 200 therefore also reduces the time taken to install a new sorbent tube 10 within a fluid-flow system, requiring only connection via screw-threaded connectors or similar.

Figure 6:
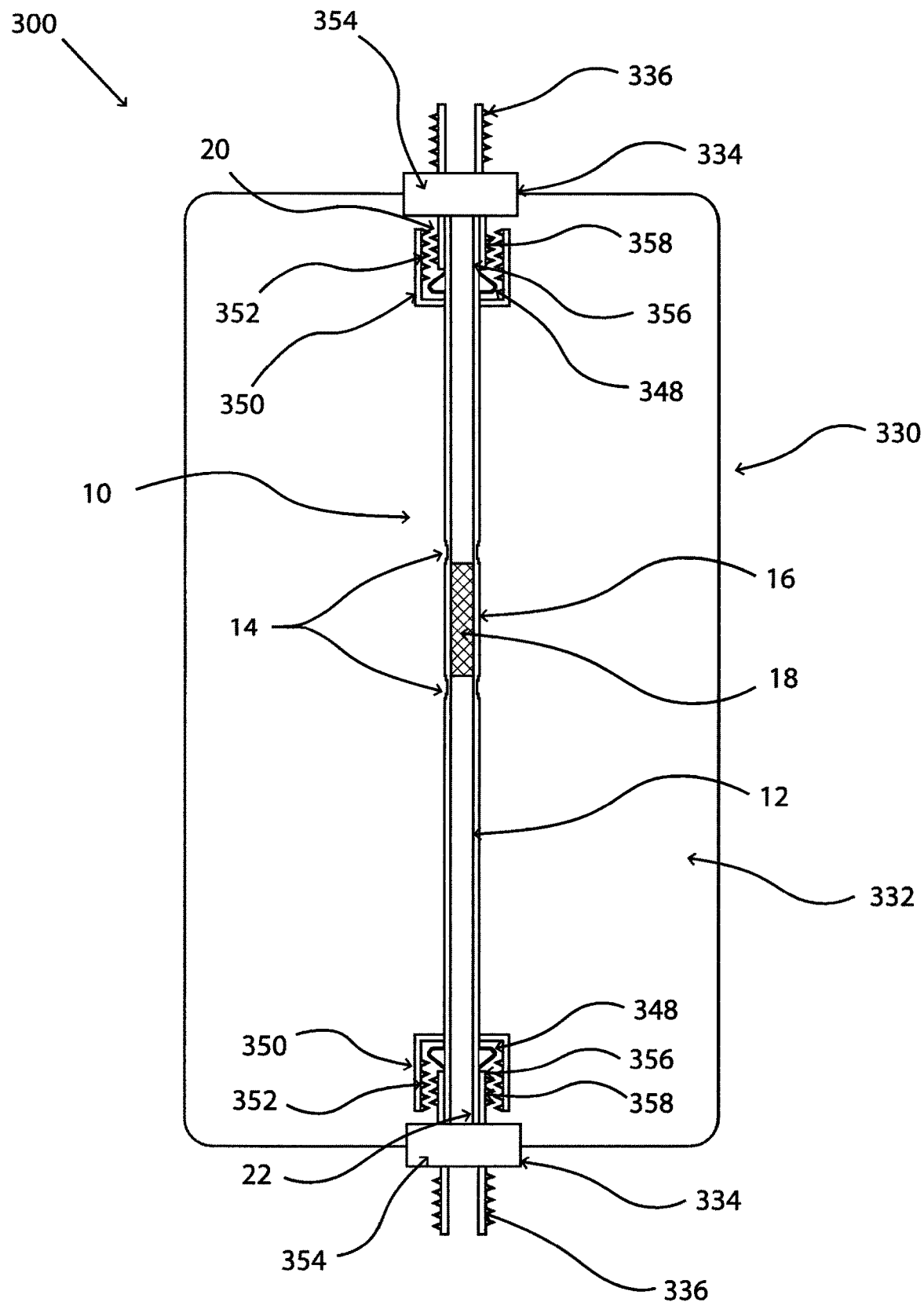
FIG. 6 shows a top plan view of a third embodiment of a sorbent tube holder in accordance with the first aspect of the invention, taken through a cross-sectional longitudinal plane through the engaged sorbent tube.

A further embodiment of a sorbent tube holder is illustrated in FIG. 6, showing a similar cross-section to that of FIG. 3, and referenced globally as 300. This embodiment illustrates a different means of mounting the sorbent tube 10 within the sorbent tube holder 300. Again, parts which are similar or identical to those of previous embodiments bear identical references or references which are incremented by 100 or 200, and as such further detailed description is omitted.

At each of the first and second ends 20, 22 of the sorbent tube 10 is connected a ferrule 348 which is a tight fit around the circumference of the sorbent tube body 12 so as to prevent fluid escape. The ferrule 348 traps a sealing nut 350 placed around the tube body 12, closer to the central chamber 16. The sealing nut 350 has an internal screw thread 352 but otherwise acts as a blanking element around each of the ends 20, 22 of the sorbent tube 10.

Attached to holder frame 330 at each of the side walls 334 perpendicular to the frame element 332 is a screw-threaded connector 354. A first end 356 of the screw-threaded connector 354 receivably engages with either the first or second end 20, 22 of the sorbent tube 10, thereby forming an external screw thread 358 around the outside of the sorbent tube 10. The second end 336 of the screw-threaded connector 354 projects outwardly of the sorbent tube 10 to thereby form a pipe connection element.

The sorbent tube 10 can be sealed in place by securing the sealing nut 350 to the first end 356 of the screw-threaded connector 354, by engaging the internal and external screw threads 352, 358 with one another. Tightening the sealing nut 350 sufficiently seals the ferrule 348 in situ on the tube body 12, forming a complete seal for the sorbent tube 10.

In this scenario, the mounting element is effectively formed by the first ends 356 of the screw-threaded connectors 354, with the ferrule 348 and sealing nut 350 forming a fastener, as per the mounting sleeve and ring clamps described in the previous embodiments.

Although not shown in this third embodiment, a cover element similar to that described with reference to the second embodiment could optionally be utilised.

Each side wall may optionally include a rubber mount or other similar shock-absorbing means which receives the respective connector and/or part of the fastener, thereby allowing some dissipation of force or shock imparted to the holder. This therefore allows greater protection and/or isolation of the sorbent tube.

It will be appreciated that although the present invention has been developed with the installation of sorbent tubes in mind, the tube holder could be used in conjunction with any number of fragile tubes, particularly glass tubes, which may be utilised in physical or chemical analysis of fluid samples. The sorbent tube example is therefore for illustrative purposes only.

Furthermore, whilst the mounting element has been described as primarily defining two mounting element portions which engage at either end of the sorbent tube to mount the sorbent tube in position, it will be apparent that there need only be sufficient mounting points provided within the tube holder so as to securely and safely mount the sorbent tube; this will likely necessitate at least two mounting points, but provided that the sorbent tube is rigidly held along the tube mounting axis by the holder frame, there is no strict require on the means of mounting the sorbent tube in place, and any number of mounting points could be provided.

It will be noted that a single tube holder could be arranged so as to enclose a plurality of sorbent tubes, arranged either in series or in parallel, and such modifications will be apparent to the skilled person.

The sorbent tube holder is here illustrated as being provided with a sorbent tube pre-installed, to allow the sorbent tube holder to act as a sorbent tube installation device. It will be appreciated that a sorbent tube holder could be provided inclusive or exclusive of the sorbent tube, and if the sorbent tube were not provided, it could be inserted into the sorbent tube holder subsequent to purchase.

It is therefore possible to provide a sorbent tube holder which can be installed into a fluid-flow system and is capable of mounting a sorbent tube therein, the holder comprising a mounting element and fasteners for affixing the sorbent tube in place, and a rigid holder frame which is able to limit or prevent off-axial displacement of the mounting element and therefore of the sorbent tube in use.

Such a tube holder significantly decreases the risk of damage to the installed sorbent tube, whilst also possibly creating a portable and readily replaceable device for installation into a fluid-flow system instead of merely replacing the sorbent tube.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A sorbent tube holder for securing a sorbent tube in position in a fluid-flow system, the sorbent tube holder comprising:
a holder frame having first and second pipe connection elements which define a tube mounting axis;
first and second mounting sleeve portions each having first and second opposed ends, the first and second mounting sleeve portions being releasably engageable with the first and second pipe connection elements respectively;
each of the first and second mounting sleeve portions including a clamping element which provides a releasable tube retaining force;
a sorbent tube engaged with the first and second mounting sleeve portions; and
the holder frame being configured to prevent or limit movement of the first and second mounting sleeve portions perpendicular to the tube mounting axis,
wherein the tube retaining force is a clamping force acting perpendicular to the tube mounting axis.

2. The sorbent tube holder as claimed in claim 1, wherein each clamping element comprises a screw-threaded fastening element.

3. The sorbent tube holder as claimed in claim 1, wherein the holder frame comprises a cover element which encloses or substantially encloses the first and second mounting sleeve portions and said sorbent tube.

4. The sorbent tube holder as claimed in claim 3, wherein the cover element is at least in part openable or releasable to permit a user to access the first and second mounting sleeve portions.

5. The sorbent tube holder as claimed in claim 1, further comprising a user-engagement handle attached to the holder frame.

6. The sorbent tube holder as claimed in claim 1, wherein the first and second pipe connection elements are screw-threaded pipe manifold connection elements.

\* \* \* \* \*